(12) United States Patent
Gazit et al.

(10) Patent No.: US 12,257,504 B2
(45) Date of Patent: Mar. 25, 2025

(54) SYSTEM AND METHOD FOR PROVIDING A GAMING SYSTEM OVER A SOFTWARE APPLICATION EXTENSION

(71) Applicant: Karma Shopping Ltd., Tel Aviv (IL)

(72) Inventors: Omer Gazit, Oporto (PT); Tamar Shachar, Tel Aviv (IL); Alexandra Rosenblum, Tel Aviv (IL)

(73) Assignee: Karma Shopping Ltd., Tel Aviv (IL)

( * ) Notice: Subject to any disclaimer, the term of this patent is extended or adjusted under 35 U.S.C. 154(b) by 0 days.

(21) Appl. No.: 18/883,746

(22) Filed: Sep. 12, 2024

(65) Prior Publication Data

US 2025/0001301 A1    Jan. 2, 2025

Related U.S. Application Data

(63) Continuation-in-part of application No. 18/174,851, filed on Feb. 27, 2023.

(51) Int. Cl.
| | |
|---|---|
| *G09G 3/00* | (2006.01) |
| *A63F 9/24* | (2006.01) |
| *A63F 13/537* | (2014.01) |
| *G02B 27/01* | (2006.01) |
| *G06F 9/445* | (2018.01) |
| *G06F 9/455* | (2018.01) |
| *G06F 17/00* | (2019.01) |

(52) U.S. Cl.
CPC .................. *A63F 13/537* (2014.09)

(58) Field of Classification Search
CPC .......... A63F 13/537; G06F 17/00; G06F 3/00; G06F 17/21; G06F 3/0481; G06F 17/30; G06F 30/392; G06F 30/31; G02F 1/01; G03H 1/08
See application file for complete search history.

(56) References Cited

U.S. PATENT DOCUMENTS

| | | | |
|---|---|---|---|
| 7,165,243 B1 | 1/2007 | Pelegri-Llopart et al. | |
| 8,549,472 B1 | 10/2013 | Tilwani | |
| 9,473,522 B1 | 10/2016 | Kotler et al. | |
| 9,666,020 B2* | 5/2017 | Gobe | G07F 17/3244 |
| 10,193,839 B2 | 1/2019 | Tandon et al. | |
| 10,374,884 B2 | 8/2019 | Dec et al. | |
| 10,460,636 B2* | 10/2019 | Salmimaa | G09G 3/002 |
| 10,505,969 B2 | 12/2019 | Gorodissky et al. | |
| 11,449,619 B2 | 9/2022 | Kotler et al. | |

\* cited by examiner

*Primary Examiner* — Thuy Dao
(74) *Attorney, Agent, or Firm* — M&B IP Analysts, LLC

(57) ABSTRACT

A system and method for providing a graphical overlay on a web page utilizing textual code is presented. The method includes initializing a matrix of elements, including a first portion and a second portion of elements, wherein the second portion have no value stored; rendering a GUI to include the matrix; storing a value in each element of the first portion of elements; generating a plurality of element groups, each element group including a plurality of elements; storing a value in each element of the plurality of elements; receiving a selection of a first element group; receiving a position respective of the first element group and the matrix; writing values of the first element group to the matrix, in response to determining that elements of the matrix corresponding to the received position are of the second portion of elements; and updating the rendered GUI based on the written values.

19 Claims, 16 Drawing Sheets

SYSTEM AND METHOD FOR PROVIDING A GAMING SYSTEM OVER A SOFTWARE APPLICATION EXTENSION

CROSS-REFERENCE TO RELATED APPLICATION

This application is a continuation-in-part of U.S. patent application Ser. No. 18/174,851, filed Feb. 27, 2023, the contents of which are hereby incorporated.

TECHNICAL FIELD

The present disclosure relates generally to software application extensions, and specifically to methods of providing software application extensions over a network

BACKGROUND

A major advantage of computer software is the ability to update software in order to achieve more features from an otherwise unaltered hardware setup. For example, there are clear advantages to upgrading a computer's operating system from an older version to a newer version which offers more features, more functionality, and a better user experience, all while preserving the original computer's hardware.

To this end, many software applications allow third party extensions, popularly known as plug-ins. Typically, a software application which supports third party extensions, known as a host application, includes a plug-in manager component having an interface with which a plug-in, third party extension, and the like, can interface with. This allows the host application to utilize the extension, thereby adding functionality to the host application.

Certain host applications, such as web browsers, may require a third party developer to preauthorize code for a software extension with the host application owner. For example, extensions for the Google® Chrome® web browser need to be approved by a review team before they are available on the Chrome Web Store. The Web Store is a repository which is accessible by a user device to download approved extensions. This ensures that user devices do not download unsupervised code which could cause harm, such as malware.

However, this also presents a challenge to software developers, as any change to the code of their software extension, no matter how insignificant, requires review, which could take days to complete.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include initializing a matrix of array elements, including a first portion of array elements and a second portion of array elements, where the second portion of array elements have no value stored. The method may also include rendering a graphical user interface (GUI) of the graphical overlay to include the initialized matrix. The method may furthermore include storing a value in each array element of the first portion of array elements. The method may in addition include generating a plurality of array element groups, each array element group including a plurality of array elements. The method may moreover include storing a value in each array element of the plurality of array elements. The method may also include receiving a selection of a first array element group of the plurality of array element groups. The method may furthermore include receiving a position respective of the first array element group and the matrix. The method may in addition include writing values of the first array element group to the matrix, in response to determining that array elements of the matrix corresponding to the received position are of the second portion of array elements. The method may moreover include updating the rendered GUI based on the written values of the first array element group. Other embodiments of this aspect include corresponding computer systems, apparatus, and computer programs recorded on one or more computer storage devices, each configured to perform the actions of the methods.

Implementations may include one or more of the following features. The method may include: removing the first array element group from the plurality of array element groups, in response to writing the values to the matrix; and generating a second array element group for the plurality of array element groups in response to removing the first array element group. The method may include: detecting that a first row of the matrix includes only array elements having each a value. The method may include: locking the array elements of the first row in response to determining that a first array element of the first row and a second array element of the first row share a common value. The method may include: clearing each array element of the first row from a stored value, in response to determining that each value of the first row is an unique value. The method may include: detecting a first array element above the first row; and writing a value stored in the first array element to a corresponding array element of the first row, in response to determining that the first row is cleared of values. The method may include: initiating an animation sequence on the GUI based on the first row, prior to clearing each array element from the stored values. The method may include: initializing a new array element group based on at least a value stored in the matrix. The method may include: sending instructions to a software extension module to initialize the matrix. Implementations of the described techniques may include hardware, a method or process, or a computer tangible medium.

In one general aspect, non-transitory computer-readable medium may include one or more instructions that, when executed by one or more processors of a device, cause the device to: initialize a matrix of array elements, including a first portion of array elements and a second portion of array elements, where the second portion of array elements have no value stored; render a graphical user interface (GUI) of the graphical overlay to include the initialized matrix; store a value in each array element of the first portion of array elements; generate a plurality of array element groups, each array element group including a plurality of array elements; store a value in each array element of the plurality of array elements; receive a selection of a first array element group of the plurality of array element groups; receive a position respective of the first array element group and the matrix; write values of the first array element group to the matrix, in response to determining that array elements of the matrix corresponding to the received position are of the second portion of array elements; and update the rendered GUI based on the written values of the first array element group. Other embodiments of this aspect include corresponding computer systems, apparatus, and computer programs recorded on one or more computer storage devices, each configured to perform the actions of the methods.

In one general aspect, a system may include one or more processors configured to: A system may also initialize a matrix of array elements, including a first portion of array elements and a second portion of array elements, where the second portion of array elements have no value stored. A system may furthermore render a graphical user interface (GUI) of the graphical overlay to include the initialized matrix. A system may in addition store a value in each array element of the first portion of array elements. A system may moreover generate a plurality of array element groups, each array element group including a plurality of array elements. A system may also store a value in each array element of the plurality of array elements. A system may furthermore receive a selection of a first array element group of the plurality of array element groups. A system may in addition receive a position respective of the first array element group and the matrix. A system may moreover include write values of the first array element group to the matrix, in response to determining that array elements of the matrix corresponding to the received position are of the second portion of array elements. A system may also include update the rendered GUI based on the written values of the first array element group. Other embodiments of this aspect include corresponding computer systems, apparatus, and computer programs recorded on one or more computer storage devices, each configured to perform the actions of the methods.

Implementations may include one or more of the following features. A system where the one or more processors are further configured to: remove the first array element group from the plurality of array element groups, in response to writing the values to the matrix; and generate a second array element group for the plurality of array element groups in response to removing the first array element group. A system where the one or more processors are further configured to: detect that a first row of the matrix includes only array elements having each a value. A system where the one or more processors are further configured to: lock the array elements of the first row in response to determining that a first array element of the first row and a second array element of the first row share a common value. A system where the one or more processors are further configured to: clear each array element of the first row from a stored value, in response to determining that each value of the first row is an unique value. A system where the one or more processors are further configured to: detect a first array element above the first row; and write a value stored in the first array element to a corresponding array element of the first row, in response to determining that the first row is cleared of values. A system where the one or more processors are further configured to: initiate an animation sequence on the GUI based on the first row, prior to clearing each array element from the stored values. A system where the one or more processors are further configured to: initialize a new array element group based on at least a value stored in the matrix. A system where the one or more processors are further configured to: send instructions to a software extension module to initialize the matrix. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
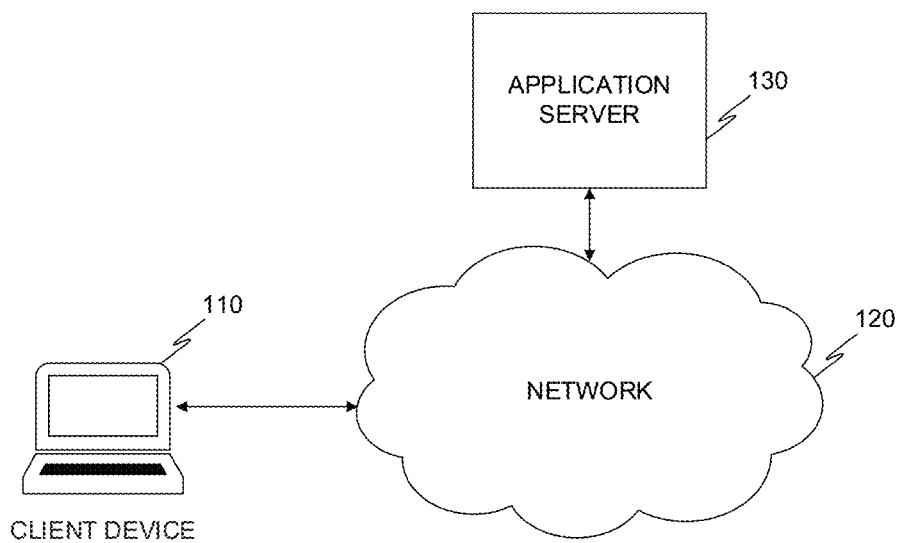
FIG. 1 is an example of a software server providing a client device with a software application, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example of a software server providing a client device with a software application, utilized to describe an embodiment. In an embodiment, a client device 110 includes an operating system, a software application, a software library, a software binary, a combination thereof, and the like. In some embodiments, a client device 110 is a personal computer (PC), a server, a laptop, a tablet, and the like. In an embodiment, the client device 110 includes an I/O interface, a display, a processor, a memory device, a storage device, a network interface controller, various combinations thereof, and the like.

In some embodiments, the client device 110 is configured to execute a software application, such as a web browser (or "browser"). In an embodiment, a browser is a software application which is configured to display markup language, such as hypertext markup language (HTML), web pages, web-based content, etc.

In an embodiment, a web browser is, for example, Mozilla Firefox™, Google Chrome®, Opera®, Safari®, and the like. In certain embodiments, the web browser is configured to accept software extension modules, also known as plugin modules. A software plugin allows to extend functionality of a software application, for example by utilizing an application programming interface of the software application to connect to the plugin module, which then provides extra functionality on top of what is provided by the software application.

Some examples of extending functionality include, for example, rendering an overlay over an existing webpage, providing additional context data to existing HTML data, providing software security, providing multimedia, blocking advertisement content, etc.

In an embodiment, the client device 110 is configured to communicate over a network 120 with an application server 130. In some embodiment, the application server 130 includes a plurality of software extension modules. In an embodiment, a software extension module include executable code which is stored in a storage of the application server 130 and provided, for example as a downloadable file, to a client device 110 in response to receiving a request for the same from the client device 110.

According to an embodiment, the application server 130 is further configured to communicate with the software extension module, and the software extension module is configured to communicate with the application server 130. For example, in an embodiment, the software extension module includes code which when executed by the client device 110 configure the client device 110 to generate a request and send the request through the network interface controller over the network 120 to the application server 130.

In an embodiment, the request includes a request for additional code (e.g., a software update), a request to authorize, a request to authenticate, a request to validate, a request for data, a data upload, a combination thereof, and the like.

Figure 2:
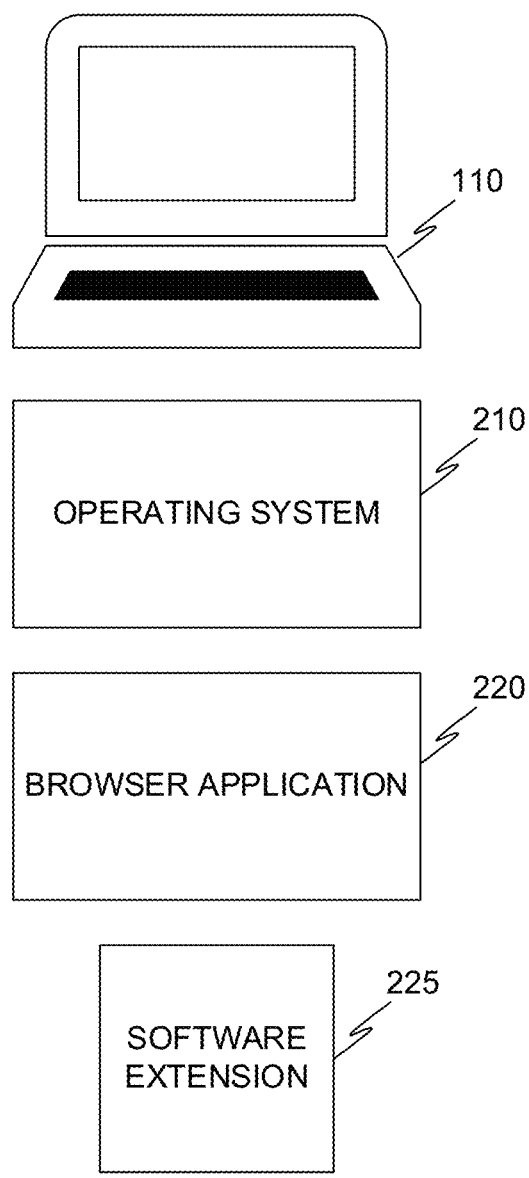
FIG. 2 is an example diagram of a client device, utilized to describe an embodiment.

FIG. 2 is an example diagram of a client device, utilized to describe an embodiment. According to some embodiments, a client device 110 is a computing device, capable of executing an application, wherein the application is capable of supporting a software extension module.

In an embodiment, the client device 110 is personal computer (PC), a server, a laptop, a tablet, and the like. In an embodiment, the client device 110 includes an I/O interface, a display, a processor, a memory device, a storage device, a network interface controller, various combinations thereof, and the like.

In some embodiments, the client device 110 includes an operating system 210. In certain embodiments, the operating system 210 is Microsoft® Windows®, Linux®, Ubuntu™, MacOS®, and the like. In an embodiment, a browser application 220 is executed, for example by configuring a processing circuitry of the client device 110 to execute computer code, on top of the operating system 210.

In an embodiment, the browser application 220 is, for example, Mozilla® Firefox™, Google Chrome®, Opera®, Safari®, and the like. In certain embodiments, the web browser is configured to accept software extension modules, also known as plugin modules.

According to an embodiment, a software extension module 225 is executed on top of the browser application 220. In an embodiment, a software plugin allows to extend functionality of a software application, for example by utilizing an application programming interface of the software application to connect to the plugin module, which then provides extra functionality on top of what is provided by the software application.

Some examples of extending functionality include, for example, rendering an overlay over an existing webpage, providing additional context data to existing HTML data, providing software security, providing multimedia, blocking advertisement content, etc.

Figure 3A:
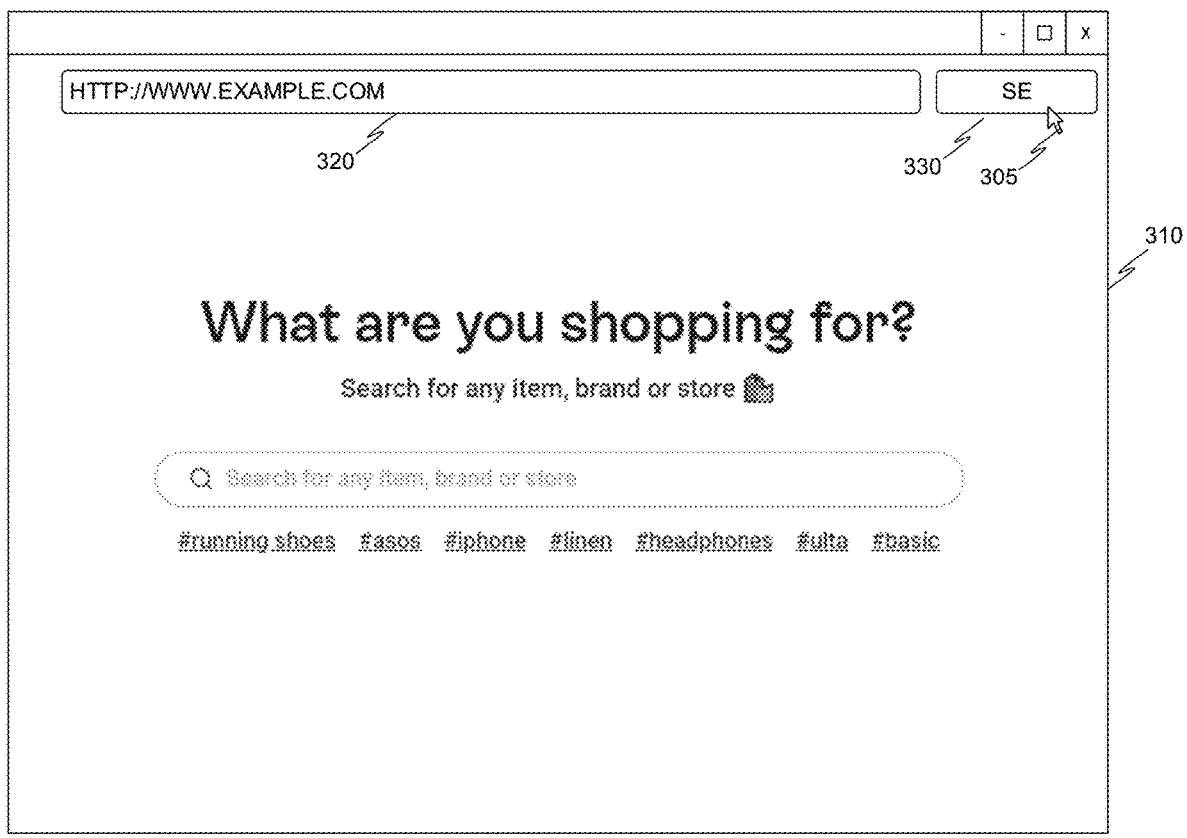
FIG. 3A is an example graphical user interface of a web browser application, utilized to describe an embodiment.

FIG. 3A is an example graphical user interface of a web browser application, utilized to describe an embodiment. In an embodiment, a graphical user interface (GUI) 310 includes a uniform resource locator (URL) bar 320, and a software extension graphical button (or simply 'button') 330.

In certain embodiments, the button 330 is an element of the GUI 310 which is interactive, for example by receiving an input from a pointer 305. In some embodiment, the pointer 305 is a graphical representation of an input received from an I/O device, such as a mouse pointer.

According to an embodiment, when the button 330 is interacted with, for example by moving the pointer 305 to the location in the GUI 310 of the button 330 and providing an input (e.g., clicking a mouse pointer), the GUI 310 is updated.

Figure 3B:
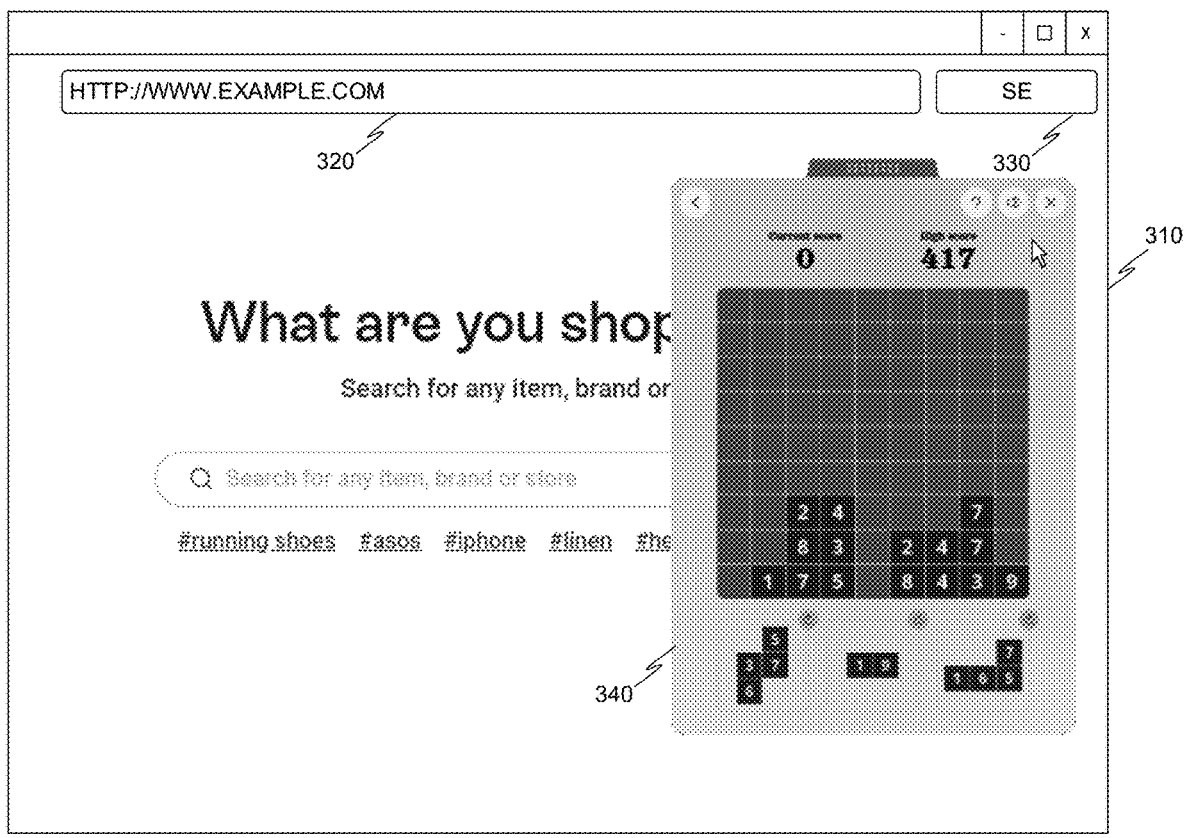
FIG. 3B is an example GUI having an overlay, implemented in accordance with an embodiment.

FIG. 3B is an example GUI having an overlay, implemented in accordance with an embodiment. In an embodiment, by interacting with the button 330, a software extension module is configured to generate a GUI overlay. For example, in an embodiment, the software extension module is configured to generate instructions which when executed by a browser application, configure a GUI 310 of the browser application to generate an overlay 340.

According to an embodiment, an overlay 340 includes a graphical element which is rendered on top of the GUI 310. In some embodiments, the overlay 340 includes a secondary GUI which includes interactive elements. In an embodiment, the secondary GUI is rendered above the GUI 310, such that any interactive element of the GUI 310 which is not rendered (for example due to being under the overlay 340) is not interactable with, for as long as the overlay 340 is rendered on top of the GUI 310.

In certain embodiments, the overlay 340 includes data, an interactive graphic element, an input, an output, a combination thereof, and the like. For example, in an embodiment, the overlay 340 renders a computer software game for display.

Figure 4A:
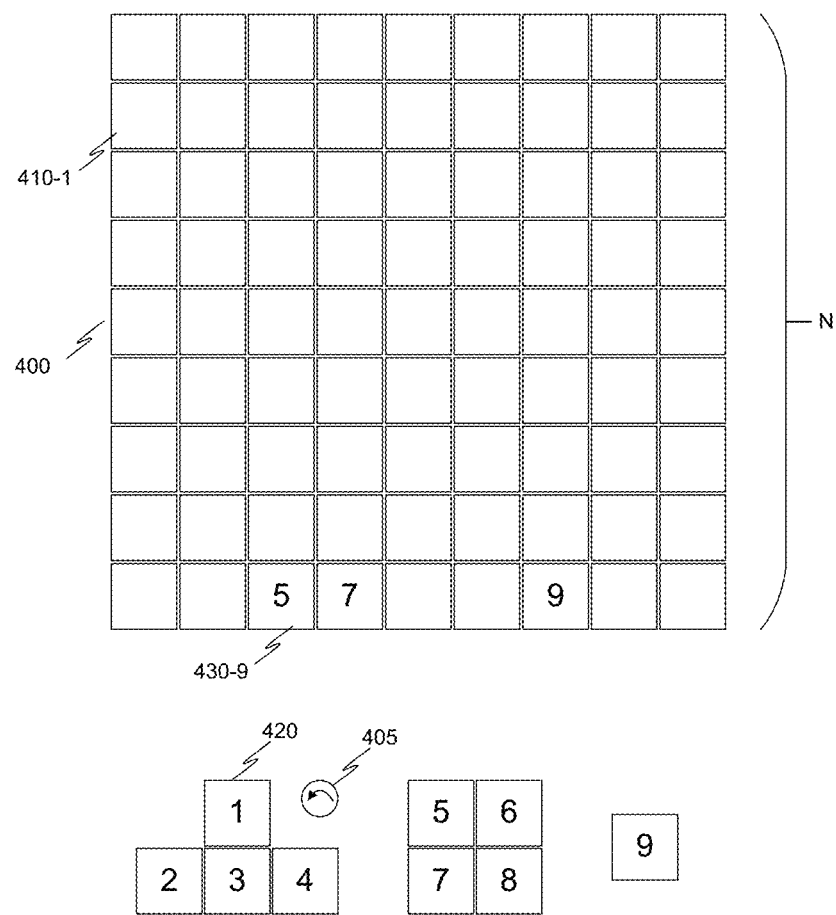
FIG. 4A is an example matrix data structure utilized in an overlay of a web browser application, implemented in accordance with an embodiment.

FIG. 4A is an example matrix data structure utilized in an overlay of a web browser application, implemented in accordance with an embodiment. In an embodiment, the matrix 400 is a data structure such as an array having 'N' by 'N' values, where 'N' is an integer having a value of '2' or more.

In an embodiment, 'N' has a value of '9', for a total of 81 elements for the matrix 400. In an embodiment, each element, such as element 410-1 stores a value, such as an integer value having a value between '1' and '9'. For example, in an embodiment, array element 430-9, which is the ninth element of the third column has a value of '5'.

In some embodiments, each row of values includes values which are unique values, i.e., no two array elements of the row have the same integer value. In an embodiment, a system, such as the application server 130 of FIG. 1 is configured to generate a group of array elements, each array element arranged in a shape. For example, according to an embodiment, a first group of array elements 420 has a plurality of array elements, arranged in a "T" shape, including a row of three array elements, and an additional array element positioned above (or below) the middle element of the row of three array elements.

In some embodiments, the system is configured to generate a plurality of array element groups, such as the first group of elements 420. In certain embodiments, the system is configured to generate each group of array elements arranged in a different shape. A shape is, for example, a "T", a square (e.g., two elements by two elements), etc, a row, etc.

According to an embodiment, an overlay is generated which includes the matrix 400 on a graphical user interface. In some embodiments, the overlay includes a rotation button 405. In an embodiment, certain arrangements of array elements, such as the first group of elements 420 can be rotated.

In an embodiment, interacting with the rotation button 405 configures the system to update the graphical user interface to render an image based on the array, rotated at a predetermined angle, for example by 90 degrees. In some embodiments, subsequently interacting with the rotation button 405 rotates the group of elements by the predetermined angle based on the current positioning of the group of elements.

Figure 4B:
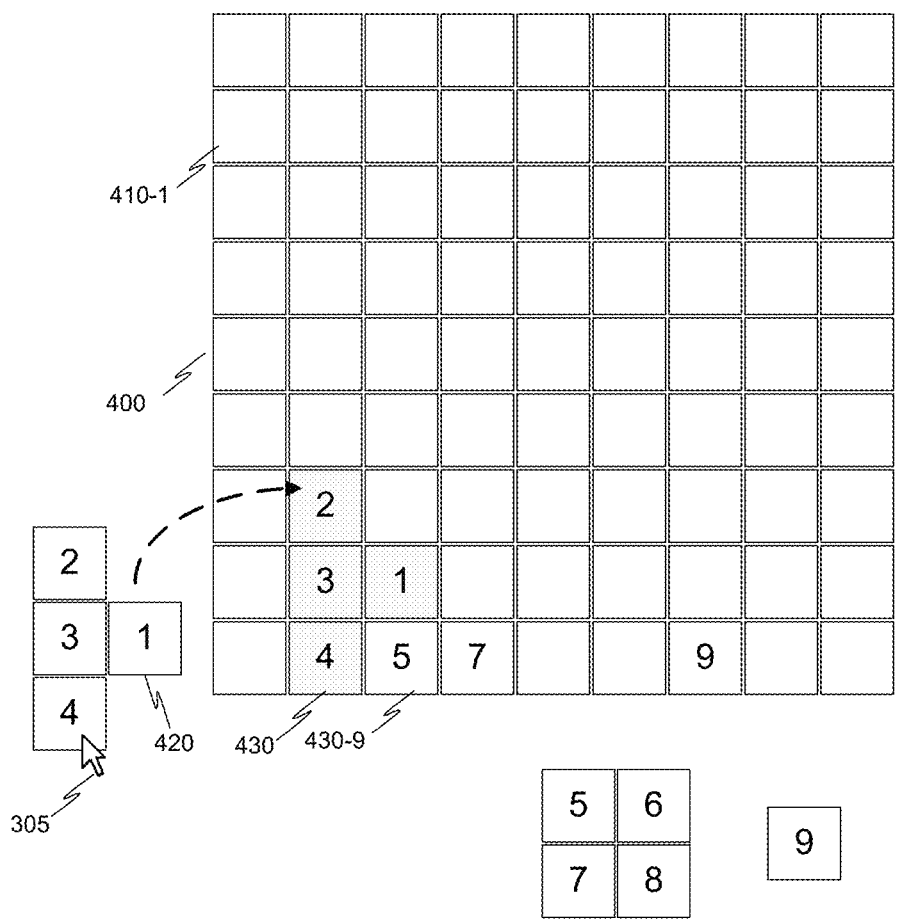
FIG. 4B is an example update of a matrix value and rendering of a graphical user interface, implemented in accordance with an embodiment.
Figure 5A:
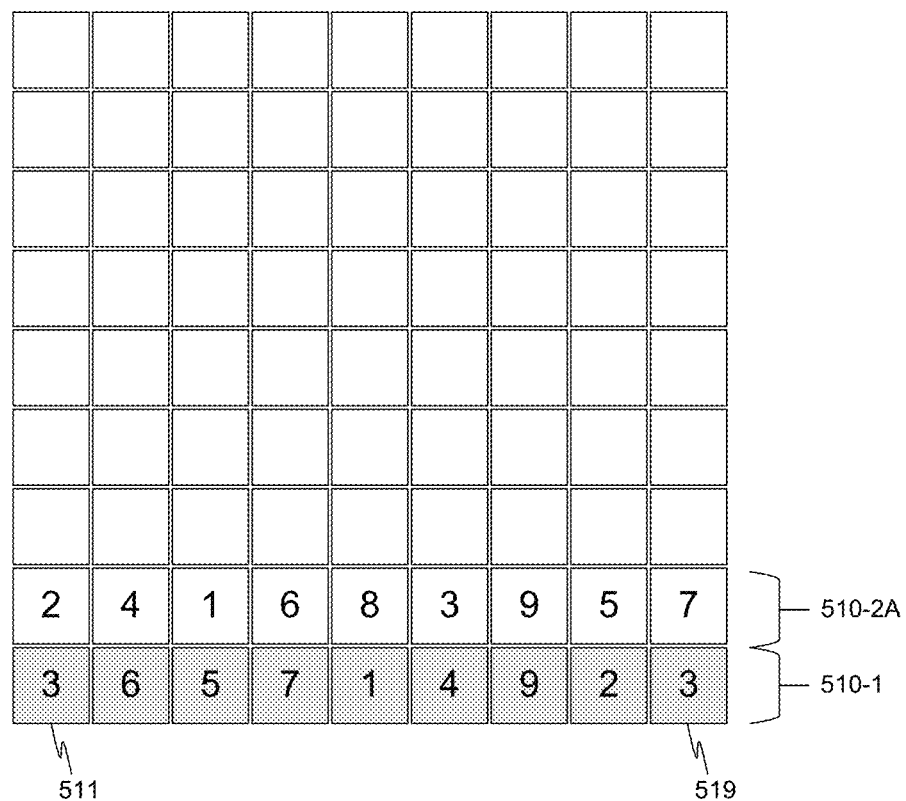
FIG. 5A through 5D are an example animation sequence of a graphical user interface, implemented in accordance with an embodiment.
Figure 5B:
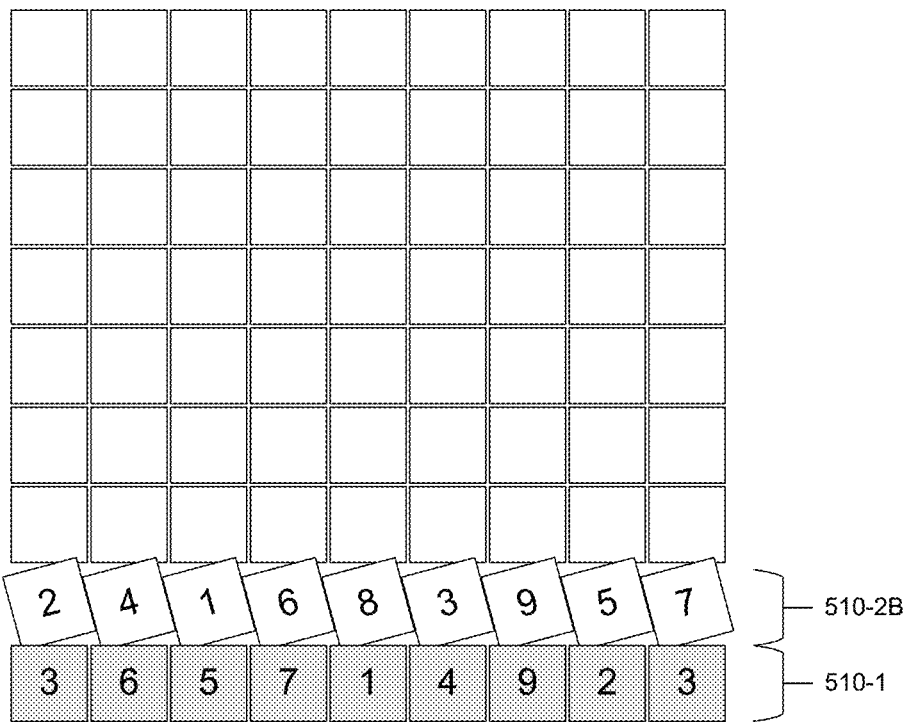
Figure 5C:
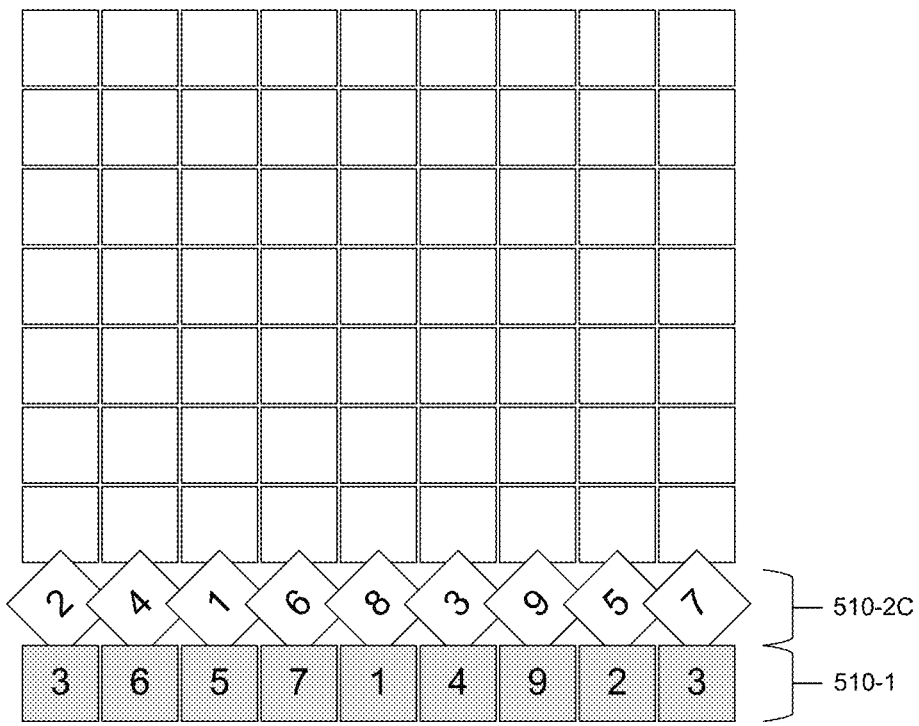
Figure 5D:
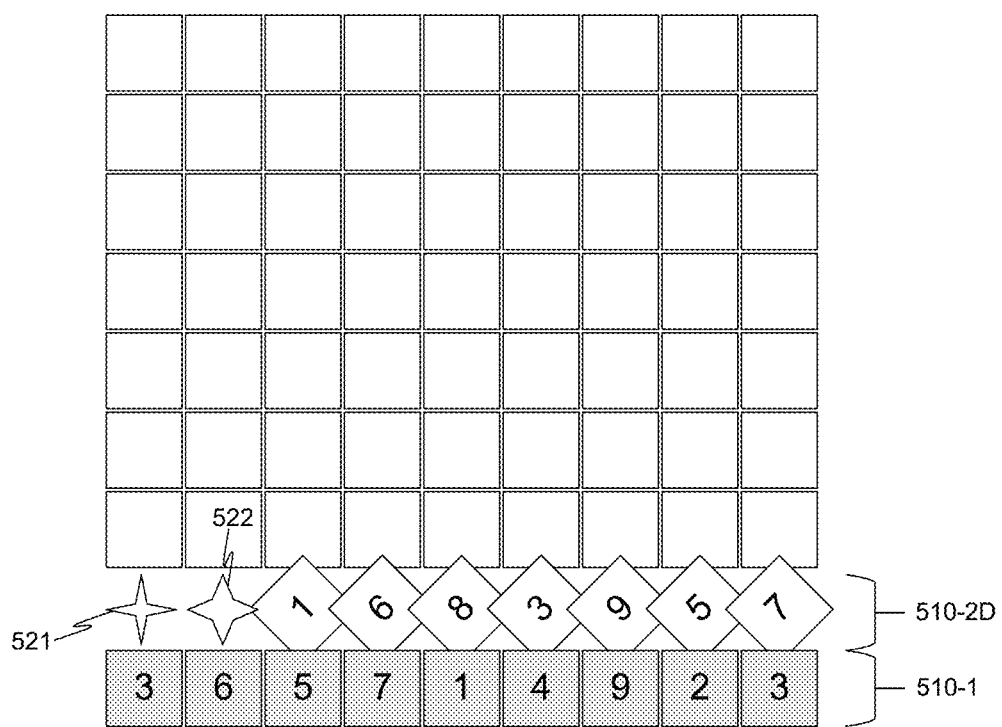

FIG. 4B is an example update of a matrix value and rendering of a graphical user interface, implemented in accordance with an embodiment. In an embodiment, a matrix 400 includes array elements which have a value, and array elements which do not have values.

In an embodiment, the first group of array elements 420 is rendered for display on a graphical user interface. In some embodiments, a pointer 305 interacts with the rendered first group of array elements 420 and can drag the first group of array elements 420 (e.g., by clicking on the same, and holding the mouse button while moving the mouse) into a position on the matrix 400.

For example, in an embodiment, the first group of array elements 420 is dragged and placed in a position 430. In some embodiments, where the array elements of the matrix 400 in the position 430 hold no values, the values of the first group of array elements 420 are written into the matrix 400 at position 430.

In some embodiments, the array elements of the position 430 are highlighted, for example by rendering them with a different color on a display. In certain embodiments, where the first group of array elements 420 is placed on a position where an array element has a value, the placement of the first group of array elements 420 is rejected, and the matrix 400 is not updated with the values thereof.

FIG. 5A through 5D are an example animation sequence of a graphical user interface, implemented in accordance with an embodiment. According to some embodiments, the animation sequence is generated based on a determination that values of the matrix satisfy a certain predetermined condition.

In an embodiment, a first row 510-1 includes a plurality of values. In some embodiments, a first portion of the values stored in the array elements are generated by the system, while a second portion of values stored in the array are initially stored in array groups, which are positioned into place, for example by a user interacting with a user interface as discussed in more detail herein.

According to an embodiment, in response to detecting that the first row 510-1 includes a value which is not unique, the first row 510-1 becomes locked, i.e., values of the row are not replaceable. In certain embodiments, a graphical user interface rendering the first row 510-1 is configured to update the rendering of the first row 510-1, such that a row having values locked is rendered with a second background color, which is different than a first background color of other rows of the matrix.

In an embodiment, the first row 510-1 becomes locked in response to detecting that a value of array element 519 is identical to a value of array element 511, which are both elements of the first row 510-1.

In some embodiments, a second row 510-2A includes a plurality of values which are each a unique value in that row, i.e., no array element value in the second row 510-2A is repeated in another array element.

In certain embodiments, in response to detecting that a row includes all values (i.e., the row does not have an array element which doesn't have a value written to it), the animation sequence is triggered.

According to an embodiment, the animation sequence includes a first frame where the row 510-2B is rendered such that each array element is titled by a predetermined amount. In some embodiments, the animation sequence includes the second row 510-2C which is rendered for display after rendering, and in place of, row 510-2B. In certain embodiments, the array elements of row 510-2C are tilted more than the array elements of row 510-2B.

In an embodiment, the animation includes a further sequence, such as of row 510-2D. In some embodiments, this animation sequence is initiated after the animation sequence of rows 510-2A through 510-2C.

In certain embodiments, a tilted array element, fully tilted array element, etc., is replaced by a first "star" 522. The star 522 is utilized merely as an example, and other shapes are utilized in some embodiments, in place of the array elements. In an embodiment, the star 522 is replaced, at a next frame of the animation sequence with subsequently thinner, smaller, etc., stars, such as star 521.

In an embodiment, each array element is replaced by another shape, by a smaller shape, etc., in an animation sequence resulting in a disappearance of the entire row 510-2D. In some embodiments, a new row is generated on top of the matrix. In an embodiment, each row of array elements above the cleared row (i.e., row 510-2D) has its values stored in a row below, thus effectively clearing the top row of the matrix of values.

Figure 6:
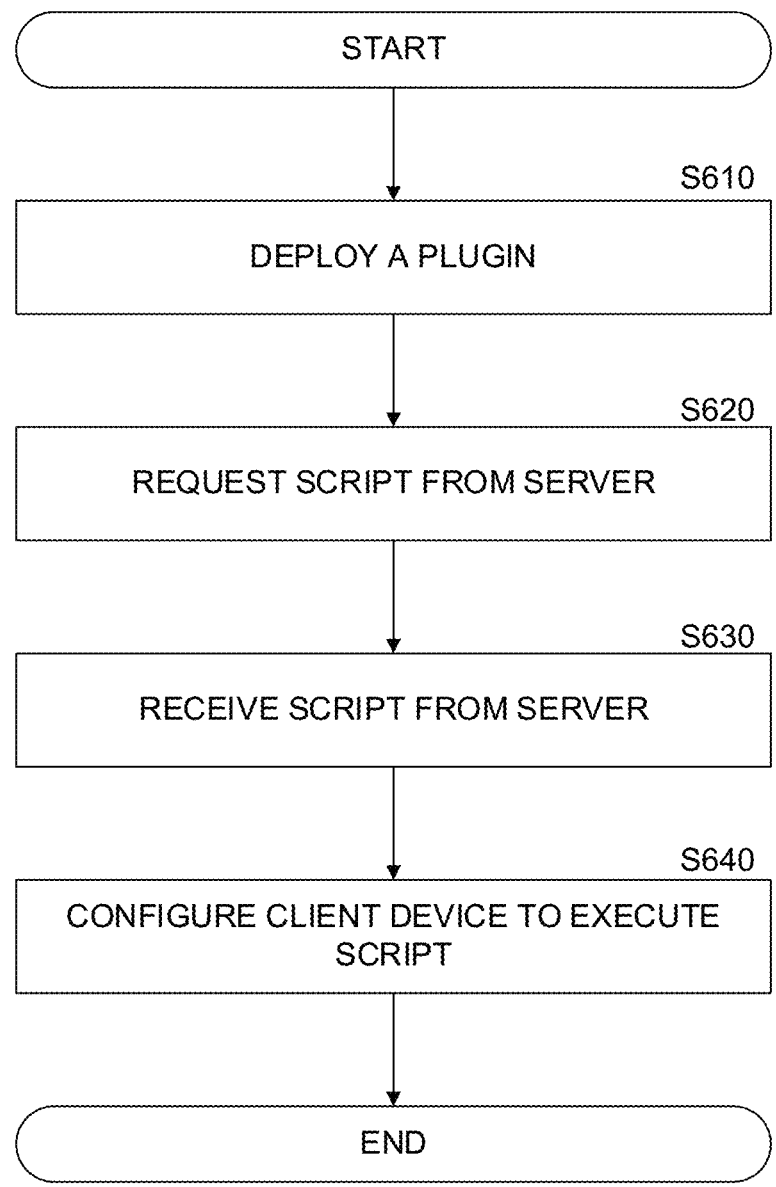
FIG. 6 is an example flowchart of a method for providing executable scripts to a software extension module, implemented in accordance with an embodiment.

FIG. 6 is an example flowchart of a method for providing executable scripts to a software extension module, implemented in accordance with an embodiment. In certain embodiments, the scripts are not executable. For example, the script includes a text which, when compiled, generates an executable instruction, according to an embodiment. In some embodiments, an executable instruction is received, for example by a script server, and a text is generated based on the executable instruction. The text is provided to a software extension module (e.g., a plugin) which is configured, according to an embodiment, to generate an executable instruction based on the text.

According to certain embodiments, this is advantageous, as it allows to deploy new software extension capabilities without requiring re-certification of the software extension module. Typically, a software extension module may be required, in certain embodiments, to be certified by an author of the software on which the software extension module is installed.

At S610, a plugin is deployed. In an embodiment, the plugin is deployed on a computing device having a host software application. In certain embodiments, the plugin is configured to communicate with a host application, wherein the host application is deployed on a computing device. In some embodiments, deploying the plugin includes accessing a repository, receiving an instruction set, and executing the instruction set to install the plugin software module on the computing device.

In an embodiment, the plugin is distinct from a host application, in that the plugin cannot be deployed "stand-alone", meaning that the plugin needs to be deployed while a host application is deployed in order to provide additional functionality to the host application.

In some embodiments, the host applications includes an I/O interface, an application programming interface, and the like, which configure the host application to communicate with a plugin, an add-on, an extension, and the like software modules which provide a function which is not provided natively by the host application.

At S620, a script is requested. In an embodiment, a script includes a software application, a computer instruction, a binary file, an executable code, a machine code, a markup language document, a text, a string, a combination thereof, and the like.

In an embodiment, the plugin is configured to periodically communicate with a script server to request a script. For example, in an embodiment, the plugin is configured to initiate a communication session, for example over a network, with the script server, such as the application server 130 of FIG. 1.

In certain embodiments, the plugin is configured to initiate communication with the script server at a predetermined network address, using a predetermined port, and a predetermined protocol. In some embodiments, the network address is an IP address, the port is 8080, and the protocol is hypertext transfer protocol secure (HTTPS).

In an embodiment, the script server is configured to listen at a predetermined port for a communication initiated from a client device through a plugin. In some embodiments, the plugin configures a network interface controller (NIC) of the client device to initiate a connection, for example over a network (including, e.g., the Internet), to the script server.

In some embodiments, the script server is configured to request a version number from the plugin. For example, in an embodiment, the plugin includes a version number which pertains to a software version of the plugin. In certain embodiments, the plugin includes a version number of a script, a rule, and the like, which were previously received by the plugin from the script server, or from another script server. In such embodiments, the plugin, the script server, both, and the like, are configured to determine, based on the version number, if a script on the script server is a newer version than a script installed on the client device on which the plugin is deployed.

In an embodiment, the plugin is configured to provide the script server with a time identifier, corresponding to the last update, i.e., the last time an input was received by the plugin from the script server. In some embodiments, the script server is configured to compare the time identifier with a value corresponding to a script, rule, and the like, stored on the script server, to determine if there is a script, rule, and the like, which was not sent to the plugin.

At S630, a script is received. In an embodiment, the script is received from a script server which is configured to send a most-recent version of a script in response to receiving a request for a script. In certain embodiments, the script is received by the plugin, which is further configured to store a plurality of script versions. In some embodiments, the plugin is configured to execute instructions based on the most-recent version of a script which is available to the plugin.

In certain embodiments, the plugin is further configured to executed a version which is not the most-recent version of the script, in response to detecting that the most-recent version of the script does not execute correctly. For example, in an embodiment, the plugin is configured to detect memory usage, processor usage, a combination thereof, and the like, and determine, based on such detected usage, if the most-recent version of the script, when executed, utilizes more computing resources than a previous version of the script, more resources than a predetermined threshold, a combination thereof, and the like.

At S640, the script is executed. In an embodiment, the plugin is configured to configure the client device to execute the script, to execute an instruction based on the script, a combination thereof, and the like.

For example, in an embodiment, the plugin is configured to receive a script, generate a computer instruction based on the received script, and configure a processing circuitry of a client device to execute the generated computer instruction.

In an embodiment, the plugin includes a rule engine. A rule engine includes a plurality of rules, policies, and the like, according to an embodiment. In some embodiments, the plugin is configured to receive a rule. A rule includes, according to an embodiment, a condition which is applied, for example, to a value, data field, and the like. For example, in an embodiment, the plugin is configured to generate an overlay on a web page displayed by the browser.

In some embodiments, the plugin is configured to generate the overlay based on a rule. For example, in an embodiment a rule states that a first graphic should be generated in response to detecting a first value on a web page. In such an embodiment, the plugin is configured to detect in the web page a data field corresponding to the first value, apply a condition of the rule to the value, and generate an instruction to render the first graphic in response to the condition of the rule being met.

According to an embodiment, the plugin is configured to generate an overlay which includes, for example, the overlay of the matrix discussed in more detail above. In some embodiments, the matrix is rendered for display as a native application, for example on an operating system of a mobile device, such as a mobile phone, smartphone, tablet, etc.

Figure 7:
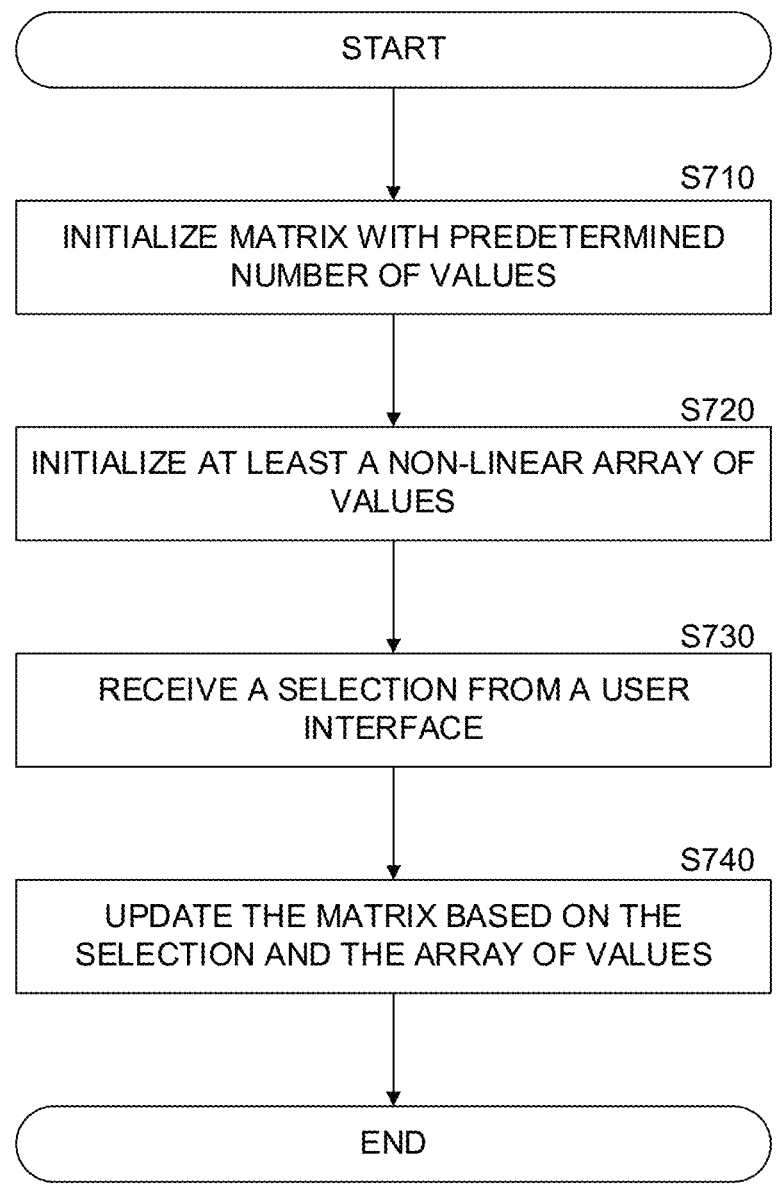
FIG. 7 is an example flowchart of a method for initializing a matrix prior to rendering the same on a display of a computing device, implemented in accordance with an embodiment.

FIG. 7 is an example flowchart of a method for initializing a matrix prior to rendering the same on a display of a computing device, implemented in accordance with an embodiment.

At S710, a matrix is initialized. In an embodiment, the matrix is initialized to include a predetermined number of values. In some embodiments, the values are selected using a random number generation technique. In certain embodiments, the values are selected such that each row of values includes unique values.

In an embodiment, the predetermined number of values are assigned to array elements of the matrix. In some embodiments, an array element is assigned a value only when another array element below it is assigned a value, or the array element is in the first (i.e., bottom) row of the matrix.

At S720, a plurality of secondary arrays is initialized. In an embodiment, initializing a plurality of secondary arrays includes generating a plurality of array element groups, each group having a unique arrangement of array elements among the generated secondary arrays.

For example, according to an embodiment, a first group is arrange as a "T" shape, having three array elements on a first row, and a fourth array element on top of the middle array element of the first row. In certain embodiments, a second group is arranged as a line, i.e., two, three, four, etc., array elements. In some embodiments, a third group is arranged in a square of elements, a fourth group is arranged in a non-linear array of values (e.g., diagonal, "L" shaped, etc.), and the like.

At S730, a selection of a secondary array is received. In an embodiment, a selection of a secondary array is received from a graphical user interface of a user device. In some embodiments, the selection includes a position of the secondary array relative to a render of the matrix, such that array elements of the secondary array overlap with array elements of the matrix.

At S740, a matrix value is updated. In an embodiment, a plurality of matrix values are updated. In some embodiments, an array element, a plurality of array elements, etc., are updated with values which are extracted from the selected secondary array.

In certain embodiments, the matrix is updated with values of the secondary array in response to determining that the array elements of the matrix which overlap with the array elements of the secondary array, such as shown in FIG. 4B, do not contain any values (i.e., no value is stored in the relevant array elements of the matrix).

In an embodiment, in response to updating values into the matrix, the secondary array is cleared, and another secondary array is generated in its place. In some embodiments, generation of a secondary array, including selecting a shape, layout, etc., of the secondary array, is performed based on a shape, layout, etc., which includes array elements of the matrix which have no values assigned to them.

Figure 8A:
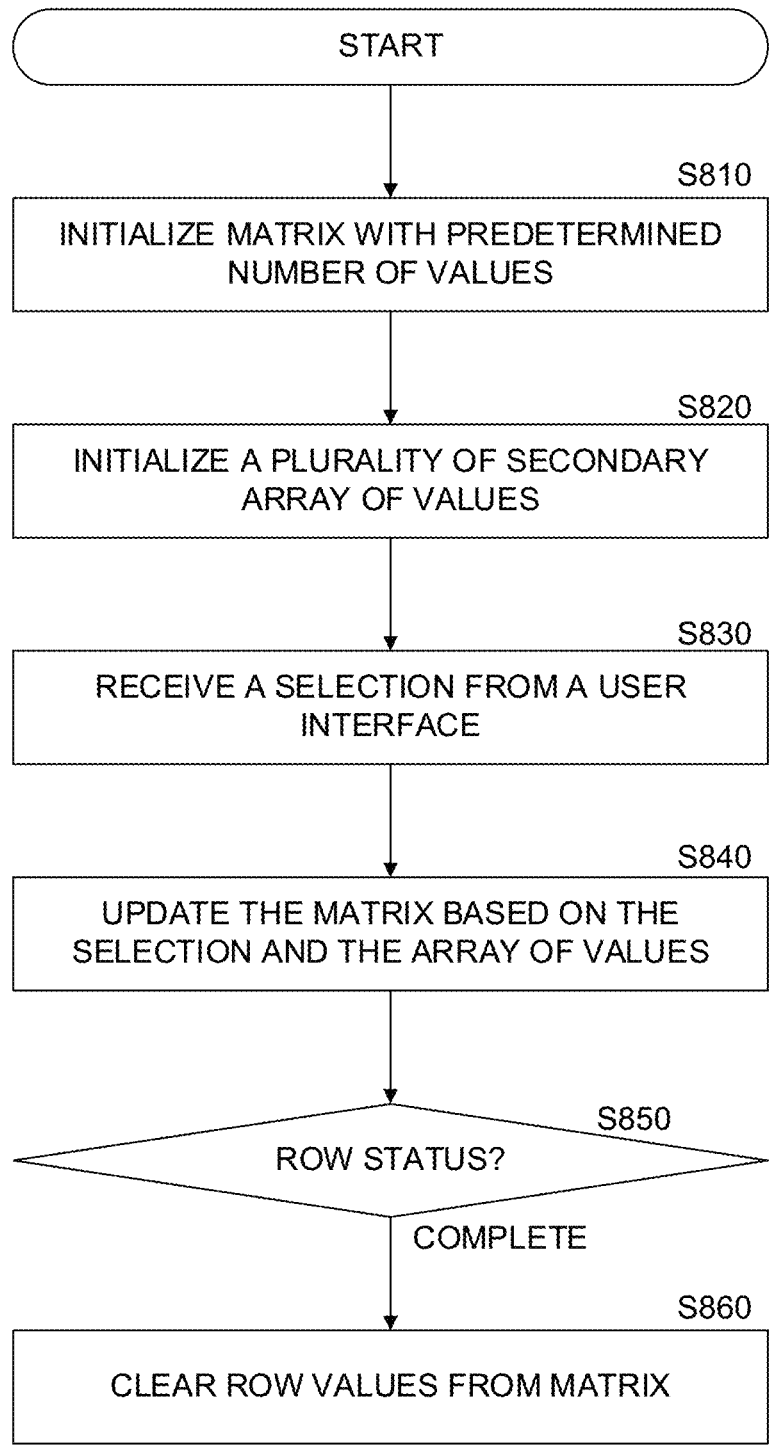
FIG. 8A through 8C are example flowcharts of a method for processing a value matrix and rendering the same on a display of a computing device, implemented in accordance with an embodiment.
Figure 8B:
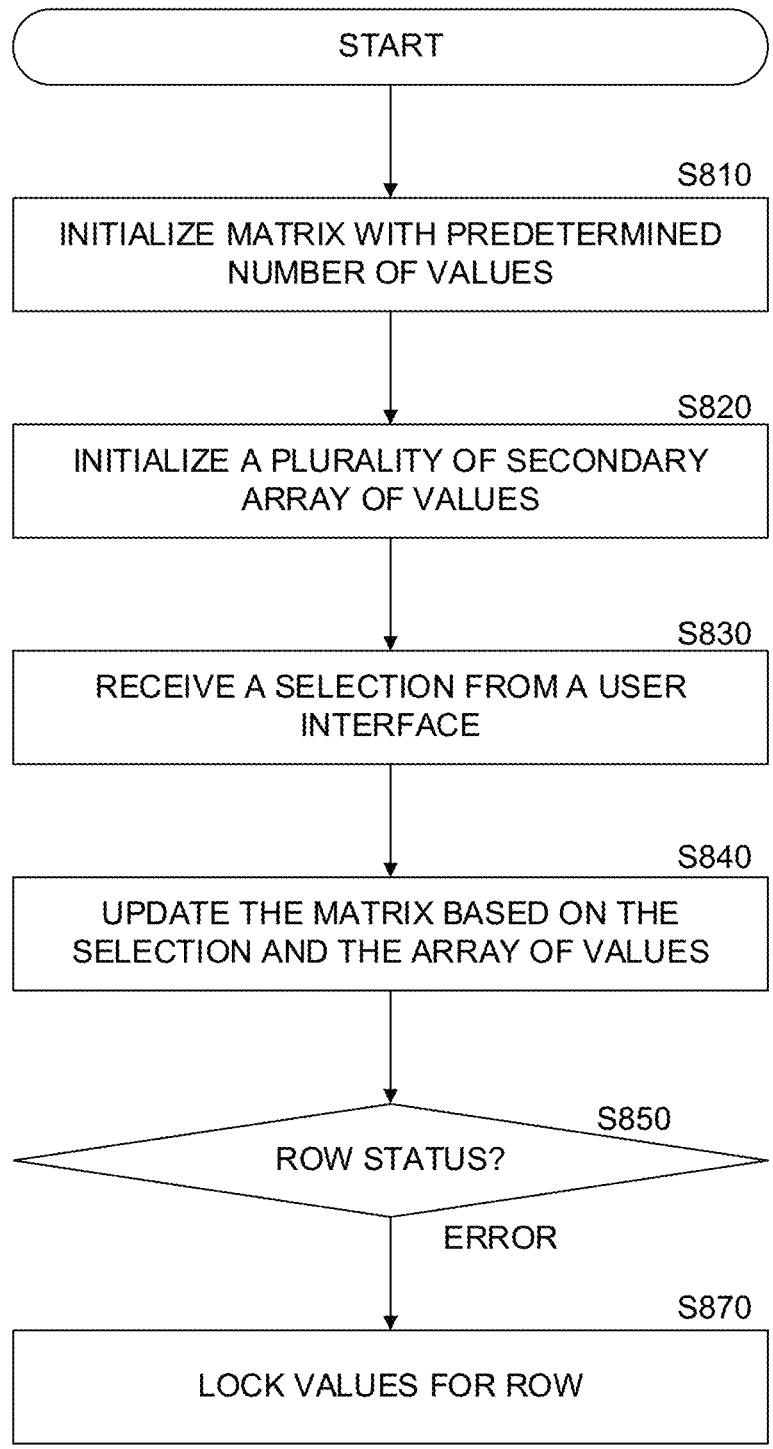
Figure 8C:
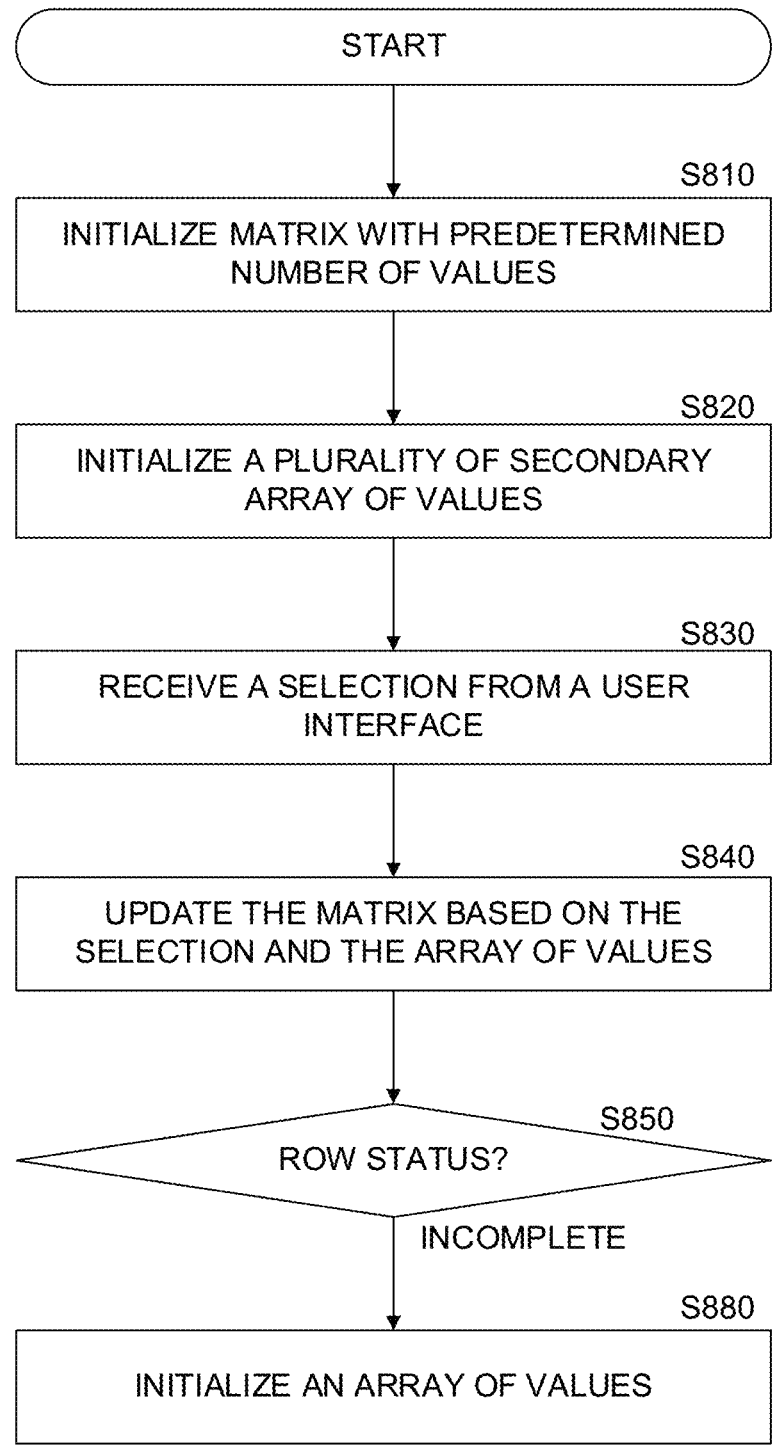

FIG. 8A-8C are example flowcharts of a method for processing a value matrix and rendering the same on a display of a computing device, implemented in accordance with an embodiment.

At S810, a matrix is initialized. In an embodiment, the matrix is initialized to include a predetermined number of values. In some embodiments, the values are selected using a random number generation technique. In certain embodiments, the values are selected such that each row of values includes unique values.

In an embodiment, the predetermined number of values are assigned to array elements of the matrix. In some embodiments, an array element is assigned a value only when another array element below it is assigned a value, or the array element is in the first (i.e., bottom) row of the matrix.

At S820, a plurality of secondary arrays is initialized. In an embodiment, initializing a plurality of secondary arrays includes generating a plurality of array element groups, each group having a unique arrangement of array elements among the generated secondary arrays.

For example, according to an embodiment, a first group is arranged as a "T" shape, having three array elements on a first row, and a fourth array element on top of the middle array element of the first row. In certain embodiments, a second group is arranged as a line, i.e., two, three, four, etc., array elements. In some embodiments, a third group is arranged in a square of elements, a fourth group is arranged in a non-linear array of values (e.g., diagonal, "L" shaped, etc.), and the like.

At S830, a selection of a secondary array is received. In an embodiment, a selection of a secondary array is received from a graphical user interface of a user device. In some embodiments, the selection includes a position of the secondary array relative to a render of the matrix, such that array elements of the secondary array overlap with array elements of the matrix.

At S840, a matrix value is updated. In an embodiment, a plurality of matrix values are updated. In some embodiments, an array element, a plurality of array elements, etc., are updated with values which are extracted from the selected secondary array.

In certain embodiments, the matrix is updated with values of the secondary array in response to determining that the array elements of the matrix which overlap with the array elements of the secondary array, such as shown in FIG. 4B, do not contain any values (i.e., no value is stored in the relevant array elements of the matrix).

In an embodiment, in response to updating values into the matrix, the secondary array is cleared, and another secondary array is generated in its place. In some embodiments, generation of a secondary array, including selecting a shape, layout, etc., of the secondary array, is performed based on a shape, layout, etc., which includes array elements of the matrix which have no values assigned to them.

At S850, a check is performed to determine row status. In an embodiment, where a row is 'complete', execution continues at S860. In some embodiments, where a row includes an 'error', execution continues at S870. In certain embodiments, where a row includes 'incomplete', execution continues at S880.

At S860, a complete row is cleared. In an embodiment, a row is complete when each array element of the row includes a unique value. For example, in an embodiment, when a first array element of a row and a second array element of a row both include the same value, the row is not a complete row.

In an embodiment, a GUI of a device is configured to generate an animation in response to detecting that a row can be cleared. In some embodiments, the animation is initiated prior to clearing the row of values. In an embodiment, once a row is cleared, values of each row above the cleared row are stored in an array element below their current array element. In some embodiments, a new row is rendered above the existing rows, such that the total number of array elements does not change once a row is cleared.

At S870, an error row is locked. In an embodiment, an error row includes an error, such as a value conflict. For example, in an embodiment, where a first array element of a row and a second array element of the row both include the same value, the row includes an error.

In an embodiment, a locked row does not permit adding values to empty array elements of the row. In some embodiments, in response to detecting a locked row, the locked row is rendered in a graphical user interface using an indicator, such as a visual indicator to indicate that the locked row is locked.

At S880, a row is determined to be incomplete. In an embodiment, an incomplete row includes at least an array element which is not assigned a value, and is also a row which does not include an error.

In an embodiment, the graphical user interface is configured to generate secondary arrays in response to detecting at least an incomplete row. In certain embodiments, a shape, a layout, and the like, of a secondary array is selected based on a layout of at least an incomplete row.

Figure 9:
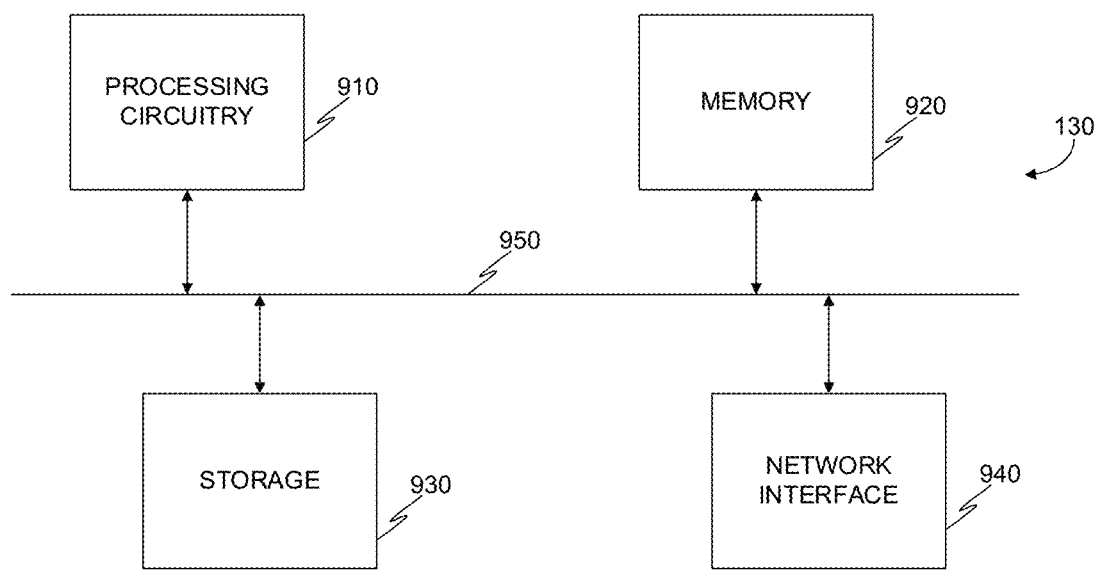
FIG. 9 is an example schematic diagram of an application server according to an embodiment.

FIG. 9 is an example schematic diagram of an application server 130 according to an embodiment. The application server 130 includes, according to an embodiment, a processing circuitry 910 coupled to a memory 920, a storage 930, and a network interface 940. In an embodiment, the components of the application server 130 are communicatively connected via a bus 950.

In certain embodiments, the processing circuitry 910 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 920 is a volatile memory (e.g., random access memory, etc.), a non-volatile memory (e.g., read only memory, flash memory, etc.), a combination thereof, and the like. In some embodiments, the memory 920 is an on-chip memory, an off-chip memory, a combination thereof, and the like. In certain embodiments, the memory 920 is a scratch-pad memory for the processing circuitry 910.

In one configuration, software for implementing one or more embodiments disclosed herein is stored in the storage 930, in the memory 920, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 910, cause the processing circuitry 910 to perform the various processes described herein, in accordance with an embodiment.

In some embodiments, the storage 930 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 940 is configured to provide the application server 130 with communication with, for example, the network 120, according to an embodiment.

It should be understood that the embodiments described herein are not limited to the specific architecture illustrated in FIG. 9, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing a graphical overlay on a web page utilizing textual code, comprising:
   initializing a matrix of array elements, including a first portion of array elements and a second portion of array elements, wherein the second portion of array elements have no value stored;
   rendering a graphical user interface (GUI) of the graphical overlay to include the initialized matrix;
   storing a value in each array element of the first portion of array elements;
   generating a plurality of array element groups, each array element group including a plurality of array elements;

storing a value in each array element of the plurality of array elements;
receiving a selection of a first array element group of the plurality of array element groups;
receiving a position respective of the first array element group and the matrix;
writing values of the first array element group to the matrix, in response to determining that array elements of the matrix corresponding to the received position are of the second portion of array elements; and
updating the rendered GUI based on the written values of the first array element group.

2. The method of claim 1, further comprising:
removing the first array element group from the plurality of array element groups, in response to writing the values to the matrix; and
generating a second array element group for the plurality of array element groups in response to removing the first array element group.

3. The method of claim 1, further comprising:
detecting that a first row of the matrix includes only array elements having each a value.

4. The method of claim 3, further comprising:
locking the array elements of the first row in response to determining that a first array element of the first row and a second array element of the first row share a common value.

5. The method of claim 3, further comprising:
clearing each array element of the first row from a stored value, in response to determining that each value of the first row is a unique value.

6. The method of claim 5, further comprising:
detecting a first array element above the first row; and
writing a value stored in the first array element to a corresponding array element of the first row, in response to determining that the first row is cleared of values.

7. The method of claim 5, further comprising:
initiating an animation sequence on the GUI based on the first row, prior to clearing each array element from the stored values.

8. The method of claim 1, further comprising:
initializing a new array element group based on at least a value stored in the matrix.

9. The method of claim 1, further comprising:
sending instructions to a software extension module to initialize the matrix.

10. A non-transitory computer-readable medium storing a set of instructions for providing a graphical overlay on a web page utilizing textual code, the set of instructions comprising:
one or more instructions that, when executed by one or more processors of a device, cause the device to:
initialize a matrix of array elements, including a first portion of array elements and a second portion of array elements, wherein the second portion of array elements have no value stored;
render a graphical user interface (GUI) of the graphical overlay to include the initialized matrix;
store a value in each array element of the first portion of array elements;
generate a plurality of array element groups, each array element group including a plurality of array elements;
store a value in each array element of the plurality of array elements;
receive a selection of a first array element group of the plurality of array element groups;
receive a position respective of the first array element group and the matrix;
write values of the first array element group to the matrix, in response to determining that array elements of the matrix corresponding to the received position are of the second portion of array elements; and
update the rendered GUI based on the written values of the first array element group.

11. A system for providing a graphical overlay on a web page utilizing textual code comprising:
one or more processors configured to:
initialize a matrix of array elements, including a first portion of array elements and a second portion of array elements, wherein the second portion of array elements have no value stored;
render a graphical user interface (GUI) of the graphical overlay to include the initialized matrix;
store a value in each array element of the first portion of array elements;
generate a plurality of array element groups, each array element group including a plurality of array elements;
store a value in each array element of the plurality of array elements;
receive a selection of a first array element group of the plurality of array element groups;
receive a position respective of the first array element group and the matrix;
write values of the first array element group to the matrix, in response to determining that array elements of the matrix corresponding to the received position are of the second portion of array elements; and
update the rendered GUI based on the written values of the first array element group.

12. The system of claim 11, wherein the one or more processors are further configured to:
remove the first array element group from the plurality of array element groups, in response to writing the values to the matrix; and
generate a second array element group for the plurality of array element groups in response to removing the first array element group.

13. The system of claim 11, wherein the one or more processors are further configured to:
detect that a first row of the matrix includes only array elements having each a value.

14. The system of claim 13, wherein the one or more processors are further configured to:
lock the array elements of the first row in response to determining that a first array element of the first row and a second array element of the first row share a common value.

15. The system of claim 13, wherein the one or more processors are further configured to:
clear each array element of the first row from a stored value, in response to determining that each value of the first row is a unique value.

16. The system of claim 15, wherein the one or more processors are further configured to:
detect a first array element above the first row; and
write a value stored in the first array element to a corresponding array element of the first row, in response to determining that the first row is cleared of values.

17. The system of claim 15, wherein the one or more processors are further configured to:
   initiate an animation sequence on the GUI based on the first row, prior to clearing each array element from the stored values.

18. The system of claim 11, wherein the one or more processors are further configured to:
   initialize a new array element group based on at least a value stored in the matrix.

19. The system of claim 11, wherein the one or more processors are further configured to:
   send instructions to a software extension module to initialize the matrix.

* * * * *